(12) United States Patent
Chang

(10) Patent No.: US 6,664,889 B2
(45) Date of Patent: Dec. 16, 2003

(54) VEHICLE REMOTE-CONTROL SYSTEM WITH DISARMING DEVICE FOR AN ANTI-THEFT UNIT THEREOF

(75) Inventor: Chen-Apin Chang, Chung-Ho (TW)

(73) Assignee: Wintecronics Co., Ltd., Chung-Ho (TW)

( * ) Notice: Subject to any disclaimer, the term of this patent is extended or adjusted under 35 U.S.C. 154(b) by 173 days.

(21) Appl. No.: 10/007,250

(22) Filed: Nov. 9, 2001

(65) Prior Publication Data

US 2003/0047999 A1 Mar. 13, 2003

(30) Foreign Application Priority Data

Sep. 7, 2001 (TW) ........................................ 90215444 U

(51) Int. Cl.[7] .............................................. B60R 25/10
(52) U.S. Cl. ............................ 340/426.17; 340/426.36; 340/825.69; 340/825.76; 340/5.62; 307/10.3; 307/10.6
(58) Field of Search ........................ 340/426.1, 426.11, 340/426.17, 426.3, 426.36, 825.76, 825.69, 5.62; 307/10.3, 10.6

(56) References Cited

U.S. PATENT DOCUMENTS

| | | | | |
|---|---|---|---|---|
| 5,623,245 A | * | 4/1997 | Gilmore | ................ 340/426.12 |
| 6,091,340 A | * | 7/2000 | Lee et al. | ............... 340/825.31 |
| 6,265,787 B1 | * | 7/2001 | Downey | ................ 340/825.72 |
| 6,392,534 B1 | * | 5/2002 | Flick | ..................... 340/426.13 |
| 6,396,388 B1 | * | 5/2002 | Dong | ........................ 340/5.62 |

* cited by examiner

Primary Examiner—Daniel J. Wu
(74) Attorney, Agent, or Firm—Marger Johnson & McCollom, P.C.

(57) ABSTRACT

In a vehicle remote-control system, an anti-theft unit includes a vehicle control module, which can receive a disarm signal directly from a signal transmitting key, and which can change from an armed state, in which an inactive state of an ignition system is maintained, to a disarmed state, in which the ignition system is activated, upon receipt of the disarm signal. A starting unit includes a starting device, which generates an enable signal upon receipt of a starting control signal from a remote controller, and which controls starting operation of the ignition system when the vehicle control module is at the disarmed state and the starting device receives the starting control signal. A signal connector is enabled by the enable signal so as to relay the disarm signal from the key to the vehicle control module.

1 Claim, 2 Drawing Sheets

VEHICLE REMOTE-CONTROL SYSTEM WITH DISARMING DEVICE FOR AN ANTI-THEFT UNIT THEREOF

CROSS-REFERENCE TO RELATED APPLICATION

This application claims priority of Taiwan patent application no. 090215444, filed on Sep. 7, 2001.

BACKGROUND OF THE INVENTION

1. Field of the Invention

The invention relates to a vehicle remote-control system, more particularly to one that incorporates a disarming device for disarming an anti-theft unit of the remote-control system.

2. Description of the Related Art

Referring to FIG. 1, a conventional anti-theft unit for a vehicle is shown to include a signal transmitting key 11 and a vehicle control module 12. Each of the signal transmitting key 11 and the vehicle control module 12 is provided with an antenna 111, 121 such that a disarm signal transmitted wirelessly by the key 11 can be received by the vehicle control module 12. The vehicle control module 12 is coupled to an ignition system 13 of a vehicle so as control activation of the latter. In actual practice, the vehicle control module 12 is able to receive the disarm signal from the key 11 only when the latter is in close proximity, such as within a transmission distance of 2 to 5 cm, with the antenna 121 of the vehicle control module 12. Upon receipt of the disarm signal, the vehicle control module 12 will perform a verification operation. If the disarm signal is found to be valid, the vehicle control module 12 will enable activation of the ignition system 13. Otherwise, the vehicle control module 12 will maintain an inactive state of the ignition system 13. Many methods are available for deactivating the ignition system 13 through the control of the vehicle control module 12. For example, the vehicle control module 12 can control the supply of electric power to the ignition system 13, thereby controlling activation and deactivation of the latter. Hence, the use of the key 11 to control activation of the ignition system 13 can deter theft.

Because the key 11 must be disposed in close proximity with the antenna 121 of the vehicle control module 12 so as to enable activation of the ignition system 13, and because of the subsequent operations that are needed to initiate starting operation of the ignition system 13, the antenna 121 is designed to be in the form of an annular antenna that is mounted around a keyhole in the vehicle. As such, when the key 11 is inserted into the keyhole, the distance between the key 11 and the antenna 121 of the vehicle control module 12 will be about 2 to 3 cm, which is within the required transmission distance, and the disarm signal transmitted by the key 11 can be received by the vehicle control module 12 via the antennas 111, 121. Upon finding the disarm signal to be valid, the vehicle control module 12 will be enabled to activate the ignition system 13. At this time, the key 11 can be turned to initiate starting operation of the ignition system 13 for moving the vehicle.

Presently, vehicles include a starting unit that can be operated via remote control for opening doors, the trunk or hood, for controlling starting operation of the ignition system, etc. However, when both the aforesaid anti-theft unit and the remote-controlled starting unit are incorporated into a vehicle, in order to start the engine of the vehicle by remote control, the key 11 must be disposed in a disarming position, e.g. in the keyhole, so that the vehicle control module 12 can be enabled to activate the ignition system 13. Only then can the starting unit be used to control the ignition system. In other words, it is not possible to start the engine of the vehicle by remote control when the key 11 is not disposed in the disarming position for disarming the vehicle control module 12.

SUMMARY OF THE INVENTION

Therefore, the main object of the present invention is to provide a vehicle remote-control system that incorporates a disarming device for disarming an anti-theft unit even when a signal transmitting key of the latter is not disposed in a disarming position.

According to the present invention, a vehicle remote-control system is adapted to control an ignition system of a vehicle, and comprises an anti-theft unit, a starting unit, and a disarming device.

The anti-theft unit includes a signal transmitting key capable of wirelessly transmitting a disarm signal, and a vehicle control module adapted to be coupled to the ignition system, and capable of wirelessly receiving the disarm signal directly from the key when the key is within a first transmission distance from the vehicle control module. The vehicle control module is capable of changing from an armed state, wherein the vehicle control module is adapted to maintain an inactive state of the ignition system, to a disarmed state, wherein the vehicle control module is adapted to activate the ignition system, upon receipt of the disarm signal.

The starting unit including a remote controller operable so as to wirelessly transmit a starting control signal, and a starting device adapted to be coupled to the ignition system and capable of receiving the starting control signal from the remote controller. The starting device generates an enable signal upon receipt of the starting control signal, and is adapted to control starting operation of the ignition system when the vehicle control module is at the disarmed state and the starting device receives the starting control signal.

The disarming device includes a signal connector connected electrically to the starting device so as to receive the enable signal therefrom. The signal connector is enabled by the enable signal so as to be capable of wirelessly receiving the disarm signal from the key and so as to be capable of wirelessly transmitting the disarm signal received thereby to the vehicle control module when the key is within a second transmission distance larger than the first transmission distance from the signal connector. The signal connector is inhibited from relaying the disarm signal from the key to the vehicle control module when the signal connector fails to receive the enable signal from the starting device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
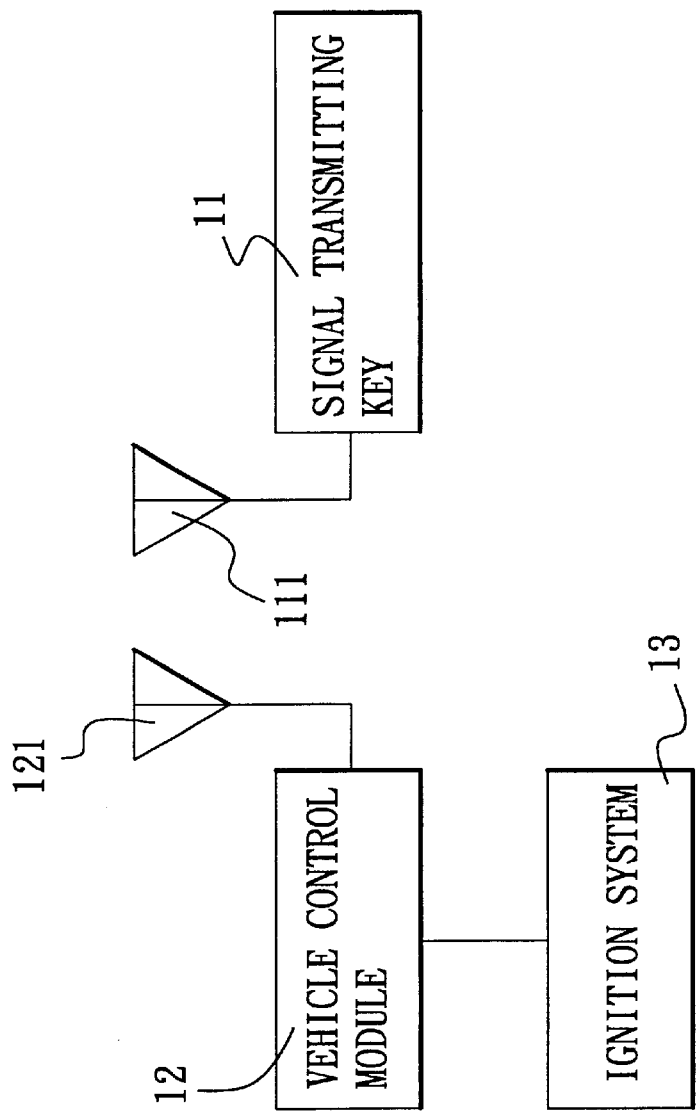
FIG. 1 is a schematic block diagram illustrating a conventional anti-theft unit for a vehicle.
Figure 2:
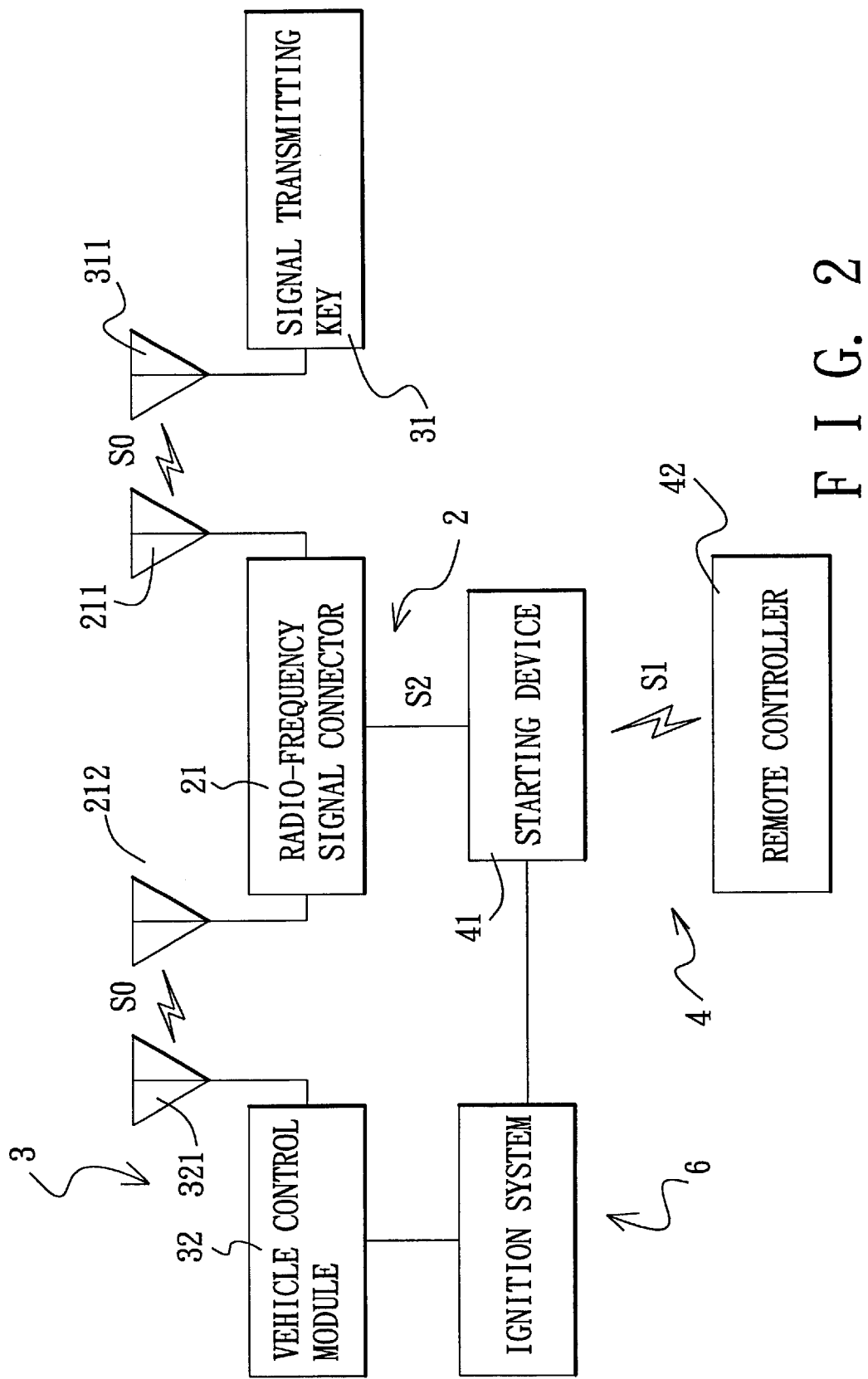
FIG. 2 is a schematic block diagram illustrating the preferred embodiment of a vehicle remote-control system that incorporates a disarming device for disarming an anti-theft unit of the remote-control system in accordance with the present invention.

Referring to FIG. 2, the preferred embodiment of a vehicle remote-control system according to the present invention is shown to comprise an anti-theft unit 3, a starting unit 4, and a disarming device 2. As the anti-theft unit 3 and the starting unit 4 are known to those skilled in the art, a detailed description of the same will be dispensed with herein for the sake of brevity. The anti-theft unit 3 includes a signal transmitting key 31, which is capable of wirelessly transmitting a disarm signal (S0) via an antenna 311 thereof. The anti-theft unit 3 further includes a vehicle control module 32 that is capable of wirelessly receiving the disarmsignal (S0) directly from the key 31 via an antenna 321 thereof, and that is coupled to an ignition system 6 of a vehicle so as to control activation of the same. In practice, the vehicle control module 32 is able to receive the disarm signal (S0) directly from the key 31 only when the latter is in close proximity, such as within a first transmission distance of 2 to 5 cm, with the antenna 321. The antenna 321 is designed to be in the form of an annular antenna that is mounted around a keyhole in the vehicle. As such, when the key 31 is inserted into the keyhole, the transmission distance between the key 31 and the antenna 321 of the vehicle control module 32 is sufficient to ensure that the disarm signal (S0) from the key 31 can be received directly by the vehicle control module 32 via the antennas 311, 321. Upon receipt of the disarm signal (S0), the vehicle control module 32 will perform a verification operation. If the disarm signal (S0) is found to be valid, the vehicle control module 32 will change to a disarmed state so as to enable activation of the ignition system 6. Otherwise, the vehicle control module 32 will remain in an armed state to maintain an inactive state of the ignition system 6.

The starting unit 4 includes a remote-controlled starting device 41 and a remote controller 42. Unlike the key 31 and the vehicle control module 32 of the anti-theft unit 3, wireless signal transmission between the starting device 41 and the remote controller 42 is possible within a larger area of coverage. The starting device 41 is coupled electrically to a number of components of the vehicle, such as the ignition system 6 and locks, which are intended to be remotely controlled. The remote controller 42 is operable so as to wirelessly transmit different remote control signals for reception by the starting device 41. The starting device 41 operates to control appropriate components of the vehicle in accordance with the remote control signal that was received from the remote controller 42. In particular, when the starting device 41 receives a starting control signal (S1) from the remote controller 42, the starting device 41 will be enabled to control starting operation of the ignition system 6 for moving the vehicle. It should be noted that control of the starting operation of the ignition system 6 via the starting device 41 is possible only when the vehicle control module 32 is in the disarmed state. To this end, upon receipt of an enable signal (S2) from the starting device 41, the disarming device 2 is responsible for disarming the vehicle control module 32 so that control of the starting operation of the ignition system 6 via the starting device 41 is possible even when the key 31 is not disposed in a position for disarming the vehicle control module 32.

In the preferred embodiment, the starting device 41 provides the enable signal (S2) to the disarming device 2 upon receipt of the starting control signal (S1) from the remote controller 42. In addition, the disarm signal (S0) from the key 31 is a high frequency signal, and the disarming device 2 includes a radio-frequency signal connector 21 connected electrically to the starting device 41 so as to receive the enable signal (S2) therefrom.

The signal connector 21 is capable of establishing a wireless transmission path between the key 31 and the vehicle control module 32, and has an input antenna 211 for receiving the disarm signal (S0) that was transmitted by the key 31, and an output antenna 212 for feeding the disarm signal (S0) that was received by the signal connector 21 to the antenna 321 of the vehicle control module 32. The enable signal (S2) from the starting device 41 is used to control the transmission of the disarm signal (S0) at the output antenna 212 of the signal connector 21. Particularly, when the signal connector 21 fails to receive the enable signal (S2), and when the key 31 is not disposed in the position for disarming the vehicle control module 32, the signal connector 21 will be inhibited from relaying the disarm signal (S0) from the key 31 to the vehicle control module 32. Accordingly, when the signal connector 21 receives the enable signal (S2) from the starting device 41, and even when the key 31 is not disposed in the position for disarming the vehicle control module 32, e.g. the key 31 is not within the first transmission distance from the vehicle control module 32 but is within a second transmission distance larger than the first transmission distance from the signal connector 21, the signal connector 21 will be enabled by the enable signal (S2) to relay the disarm signal (S0) that was received from the key 31 via the input antenna 211 to the vehicle control module 32 via the output antenna 212. In other words, the antenna 321 of the vehicle control module 32 can receive the disarm signal (S0) under the latter circumstance.

In use, when the key 31 is not disposed in the position for disarming the vehicle control module 32, and the signal connector 21 has yet to receive the enable signal (S2) from the starting device 41, the vehicle control module 32 will be unable to receive the disarm signal (S0), and will thus maintain an inactive state of the ignition system 6. However, when the remote controller 42 is operated to provide the starting control signal (S1) to the starting device 41, the starting device 41 will provide the enable signal (S2) to the signal connector 21. In response to the enable signal (S2), the disarm signal (S0) from the key 31 will be relayed by the signal connector 21 to the vehicle control module 32, thereby enabling activation of the ignition system 6. At this time, the starting device 41 can control the ignition system 6 to start the engine of the vehicle via remote control.

It has thus been shown that, in the vehicle remote-control system of the present invention, when it is intended to start the engine of the vehicle by remote control, the ignition system can be activated even when the key of the anti-theft unit is not disposed in the position for disarming the vehicle control module. The object of the present invention is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A vehicle remote-control system for controlling an ignition system of a vehicle, comprising:
   an anti-theft unit including
      a signal transmitting key capable of wirelessly transmitting a disarm signal, and
      a vehicle control module adapted to be coupled to the ignition system, and capable of wirelessly receiving the disarm signal directly from said key when said key is within a first transmission distance from said vehicle control module,
   said vehicle control module being capable of changing from an armed state, wherein said vehicle control module is adapted to maintain an inactive state of the ignition system, to a disarmed state, wherein said vehicle control module is adapted to activate the ignition system, upon receipt of the disarm signal;

a starting unit including
- a remote controller operable so as to wirelessly transmit a starting control signal, and
- a starting device adapted to be coupled to the ignition system and capable of receiving the starting control signal from said remote controller, said starting device generating an enable signal upon receipt of the starting control signal, and being adapted to control starting operation of the ignition system when said vehicle control module is at the disarmed state and said starting device receives the starting control signal; and a disarming device including a signal connector connected electrically to said starting device so as to receive the enable signal therefrom,
- said signal connector being enabled by the enable signal so as to be capable of wirelessly receiving the disarm signal from said key and so as to be capable of wirelessly transmitting the disarm signal received thereby to said vehicle control module when said key is within a second transmission distance larger than the first transmission distance from said signal connector,
- said signal connector being inhibited from relaying the disarm signal from said key to said vehicle control module when said signal connector fails to receive the enable signal from said starting device.

* * * * *